United States Patent [19]
Hansen et al.

[11] Patent Number: 5,953,683
[45] Date of Patent: Sep. 14, 1999

[54] SOURCELESS ORIENTATION SENSOR

[75] Inventors: Per Krogh Hansen, Burlington; Vladimir Kogan, S. Burlington, both of Vt.

[73] Assignee: Ascension Technology Corporation, Burlington, Vt.

[21] Appl. No.: 08/946,916

[22] Filed: Oct. 9, 1997

[51] Int. Cl.[6] .............................. G01B 7/30; G01C 17/38
[52] U.S. Cl. ............................. 702/95; 702/92; 702/150; 324/207.17; 324/247; 33/355 R
[58] Field of Search ....................... 702/95, 92, 150–154; 324/207.12, 207.17, 247, 253; 33/355 R, 356, 361

[56]  References Cited

U.S. PATENT DOCUMENTS

| | | | |
|---|---|---|---|
| 4,000,658 | 1/1977 | Schmidt ................................... | 702/150 |
| 4,429,469 | 2/1984 | Tsushima et al. ....................... | 702/150 |
| 4,686,772 | 8/1987 | Sobel ....................................... | 33/333 |
| 4,918,824 | 4/1990 | Farrar ...................................... | 33/361 |
| 5,161,311 | 11/1992 | Esmer et al. ............................ | 324/247 |
| 5,255,442 | 10/1993 | Schierbeck et al. ..................... | 324/252 |
| 5,373,857 | 12/1994 | Travers et al. .......................... | 600/595 |
| 5,525,901 | 6/1996 | Clymer et al. ..................... | 324/207.21 |
| 5,526,022 | 6/1996 | Donahue et al. ........................ | 324/253 |
| 5,645,077 | 7/1997 | Foxlin ..................................... | 600/587 |
| 5,767,669 | 6/1998 | Hansen et al. ...................... | 324/207.12 |
| 5,850,624 | 12/1998 | Gard et al. ............................... | 702/150 |

*Primary Examiner*—John E. Barlow, Jr.
*Assistant Examiner*—Bryan Bui
*Attorney, Agent, or Firm*—H. Jay Spiegel

[57]  ABSTRACT

In a sourceless orientation sensor, the sensor measures the three orientation angles azimuth, elevation and roll in a fixed reference three-dimensional coordinate frame. The sensor utilizes a three-axis magnetic sensor to measure changes in the Earth's magnetic field in order to determine the azimuth and roll (or elevation) angles after the elevation (or roll) angle has been determined by other means. A first embodiment utilizes a separate sensor to measure the elevation (or roll) angle in a fixed reference three-dimensional coordinate frame while a three axis magnetic sensor is used to measure the Earth's magnetic field. The azimuth and the roll (or elevation) angles are then determined from these measurements. A second embodiment utilizes a combination of a three-axis accelerometer to sense the Earth's gravity to measure the absolute elevation and roll angles for slow motions and a two-axis rate sensor to measure the azimuth and elevation velocities in the sensor frame. A direct method employing translation and integration is used to find the azimuth and elevation angles in the fixed reference three-dimensional coordinate frame. The roll angle is then found from the magnetic sensor measurements. Other embodiments are disclosed.

36 Claims, 9 Drawing Sheets

SOURCELESS ORIENTATION SENSOR

BACKGROUND OF THE INVENTION

The present invention relates to embodiments of sourceless orientation sensors. The present invention teaches the measurement of all three orientation angles azimuth, elevation and roll in a fixed reference three-dimensional coordinate frame. The system utilizes a three-axis magnetometer to sense the Earth's magnetic field and thereby measure the azimuth and roll angles after the elevation angle has been determined by other means. The system uses the Earth's gravity vector, a rate sensor or a differential accelerometer pair or combination thereof to measure the elevation angle.

Much research has been made concerning sourceless orientation sensors. Most of these efforts utilize the Earth's magnetic field and a three-axis magnetometer to measure the azimuth angle after the roll and elevation angles have been determined by other means.

A first class of sourceless trackers utilizes fluid filled tilt sensors of various degrees of sophistication. The problem with use of liquid filled tilt sensors concerns their "slosh" effect, which becomes apparent during fast movements and quick stops. It can take more than one millisecond before the liquid stops "sloshing", resulting in considerable errors in angle determination. Newer systems use more effectively damped liquid filled tilt sensors where the "sloshing" effect is diminished, but still apparent.

A second class of sourceless trackers utilizes a two or three axis accelerometer and the Earth's gravity in order to measure the elevation and roll angles. These systems exhibit large errors during translation, since the accelerometers are also affected by translation accelerations.

A third class of sourceless trackers utilizes a two or three axis accelerometer and the Earth's gravity in order to measure the elevation and roll angles, when there is no translation. During accelerations, three rate sensors are used to measure the azimuth, elevation and roll angles. This means that three different technologies are employed. The rate sensors experience considerable drift and the accelerometers and magnetometer measurements compensate for the drift when the sensor is held still.

The following prior art is known to Applicants:

U.S. Pat. No. 5,526,022 to Donahue et al. discloses an example of the first class of sourceless orientation sensor as described above. The device utilizes an optical tilt sensor filled with a liquid and employs a float to measure the elevation and roll angles and includes a three-axis magnetometer which is used to measure the azimuth angle. The Donahue et al. system is affected by the "slosh" effect. The system does not utilize accelerometers or rate sensors. The present invention avoids the "slosh" effect.

U.S. Pat. No. 5,373,857 to Travers et al. discloses a three-axis magnetometer which measures the azimuth angle only as referenced to the Earth's magnetic North, where elevation and roll are determined from a tilt sensor. The system will not work if the sensor's roll angle is other than zero. Only measurements of rotation around a vertical axis may be made and the system only measures the azimuth angle. In contrast, the present invention measures azimuth, elevation and roll angles. The Travers et al. patent only teaches the use of a dual axis magnetometer to measure the azimuth angle for a Helmet Mounted Display. This scheme will only work if the elevation and roll angles are either zero or known by other means. The Travers et al. patent only teaches that simple liquid filled sensors can be used to measure these two other angles, elevation and roll and teaches the periodic calibration of the headset to a known calibration position (column 3, lines 36–45). The present invention carries out one initial calibration at the start of the operation and does not require any calibration, but will continue to output all three orientation angles relative to a fixed reference three-dimensional coordinate frame. The magnetic sensors are used in a first embodiment to measure both the azimuth and the elevation (or roll) angles. A second embodiment teaches the use of the magnetic sensors to measure the roll angle. It is also used for drift compensations. A third embodiment teaches the use of the magnetic sensors to measure the roll and azimuth angles. It is also used for drift compensations. The present invention does not have any "slosh" effect. It uses the magnetic sensor to measure orientation angles not restricted to one angle around a vertical axis and where roll and elevation angles can be of any value.

The "Interglide, Inertial Tracking System" developed by Eric Foxlin for Intersense and described in U.S. Pat. No. 5,645,077, utilizes three orthogonal solid state angular rate sensors, a two axis fluid inclinometer and a fluxgate compass (a three-axis magnetometer of the above-described first class). The angular rates in the sensor frame are integrated and translated to obtain angular orientation angles (azimuth, elevation and roll in a fixed reference three-dimensional coordinate frame) with instantaneous response, but slow drift. To compensate for drift, the tracker contains a compass and an inclinometer which periodically takes reference readings. Each time the user's head is motionless for a few moments, the tracker slowly resets itself to the orientation shown by the compass and the inclinometer. Variations of this system utilize a three-axis accelerometer of the above-described third class instead of the two-axis fluid inclinometer. The Foxlin patent does not teach the use of only two rate sensors to measure two orientation angles in the fixed reference three-dimensional coordinate frame. Equations 1, 2 and 3 clearly show that in order to translate the measurements taken with the rate sensors (in the sensor frame), one must know all three angle velocities in the sensor frame or assume that they are zero. FIGS. 8 and 10 of Foxlin show three rate sensors. FIG. 4C, item 462 shows the use of rate sensors and item 466 shows the conversion using the Equations 1, 2 and 3. If only two rate sensors are used, one must assume that the third rate angular velocity must be zero. If the roll velocity is assumed to be zero, then it is possible to translate all of the velocities to the fixed reference coordinate system and thereby find the three orientation angles. No other method is taught in the Foxlin patent. It is then possible to find all of the three orientation angles in the fixed reference coordinate system. It is not possible to measure only two angle velocities in the sensor frame and then only find two orientation angles in the fixed reference three-dimensional coordinate frame. (It is, however, possible to use only two rate sensors and find two orientation angles, but they are in the sensor frame.) All of the three orientation angles must be known at the time t in order to use Equations 1, 2 and 3.

In contrast to the teachings of Foxlin, the present invention utilizes only one rate sensor, a two-axis accelerometer and a two-axis magnetic sensor. The present invention measures the azimuth, elevation and roll angles in a fixed reference system. The present invention utilizes measurements of the Earth's magnetic field by magnetic sensors that can be used to determine two angles if one angle is determined by another means. The measurements of the Earth's field are not affected by translation acceleration.

The TRK300 system utilizes a three-axis accelerometer to measure the roll and elevation angles and a three-axis magnetometer to measure the azimuth angle. The system is of the second class as described above and is affected by translation acceleration.

The problems with prior art orientation sensors clearly demonstrate the need for a system that will overcome the inherent limitations with the "slosh" effect, large lag, complex and bulky systems. The need for such a system was the impetus for the development of the present invention, encompassing a simple, fast response orientation sensor.

SUMMARY OF THE INVENTION

The present invention relates to a sourceless orientation sensor. The present invention is disclosed in terms of three preferred embodiments thereof. According to a broad aspect of this invention, a sourceless orientation sensor is disclosed. The sensor measures the three orientation angles azimuth, elevation and roll in a fixed reference three-dimensional coordinate frame. The sensor utilizes a three-axis magnetic sensor to measure changes in the Earth's magnetic field in order to determine the azimuth and roll (or elevation) angles after the elevation (or roll) angle has been determined by other means.

In a first embodiment, a separate sensor is utilized to measure the elevation (or roll) angle in a fixed reference three-dimensional coordinate frame. A three-axis magnetic sensor is used to measure the Earth's magnetic field. The azimuth and the roll (or elevation) angles are then determined from these measurements.

In a second embodiment, a three-axis accelerometer is used to sense the Earth's gravity to measure the absolute elevation and roll angles, for slow motion, and a two-axis rate sensor is used to measure the azimuth and elevation velocities in the sensor frame. The three-axis accelerometer used to measure the Earth's gravity is effective, by itself, so long as there is no translation movement. If translation movement occurs, the three-axis accelerometer output must be heavily filtered by a lowpass filter that will necessarily cause substantial lag if used alone. This problem is solved by using the two-axis rate sensor. The drift problem caused by integration of the output of the rate sensor is solved by resetting the integrator and offsets every time there is no translation movement or rate output for a prescribed time period. A direct method employing translation and integration is used to find the azimuth and elevation angles. The roll angle is then found from the magnetic sensor measurements. A variation of this embodiment utilizes a pair of differential accelerometers separated from one another by a known distance and in replacement for each rate sensor. A simple integration of the sum output from this differential pair obtains the angular velocity or rate similar to the output of the rate sensor. Only a two-axis accelerometer is really needed, since the Earth's gravity is constant, so that the third axis can be calculated from the measurements of the first two axes. Only a two-axis magnetic sensor is needed, since the Earth's magnetic field is constant when operating in the same geographical area, therefore, the third axis can be calculated from the measurements of the first two axes.

In a third embodiment, a three-axis accelerometer is employed to sense the Earth's gravity and to measure the absolute elevation and roll angles, for slow motion, and a rate sensor is used to measure the elevation velocity in the sensor frame. The three-axis accelerometer measuring the Earth's gravity is effective, by itself, if there is no translation movement. If there is translation movement, the three-axis accelerometer output must be heavily filtered by a lowpass filter that will cause substantial lag if used alone. This problem is solved by using the rate sensor. The drift problem caused by the integration of the rate sensor output is solved by resetting the integrator and offsets every time there is no translation movement or rate output for a prescribed time period. An iterative method employing translation and integration is used guided by the magnetic sensor measurements in order to determine azimuth, elevation and roll in the fixed reference three-dimensional coordinate frame. A variation of this embodiment utilizes a pair of differential accelerometers separated from one another by a known distance in replacement for the rate sensor. A simple integration of the sum output from the differential pair yields the angular velocity or rate similar to the output of the rate sensor. Only a two-axis accelerometer is needed, since the Earth's gravity is constant, therefore, the third axis can be calculated from the measurements of the first two axes. Only a two-axis magnetic sensor is really needed, since the Earth's magnetic field is constant when operated in the same geographical area, so the third axis can be calculated from the measurements of the first two axes.

Accordingly, it is a first object of the present invention to provide a sourceless orientation sensor.

It is a further object of the present invention to provide such a unique and enhanced technique for making a sourceless orientation sensor to facilitate faster and more accurate operation than previously known and with simplification of components.

It is a yet further object of the present invention to provide such a device including, in a first embodiment thereof, a separate sensor to measure elevation or roll angle in a fixed reference three-dimensional coordinate frame.

It is a still further object of the present invention to provide such a device, in a second embodiment thereof, that utilizes the combination of a three-axis magnetic sensor to sense the Earth's magnetic field and a two-axis rate sensor to measure azimuth and elevation velocities to facilitate determination of azimuth, elevation and roll angles in the fixed reference three-dimensional coordinate frame.

It is a still further object of the present invention to provide such a device, in a third embodiment thereof, that utilizes a combination of a three-axis magnetic sensor to sense the Earth's magnetic field along with a rate sensor to measure elevation velocity to facilitate determination of the azimuth, elevation and roll angles in the fixed reference three-dimensional coordinate frame.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
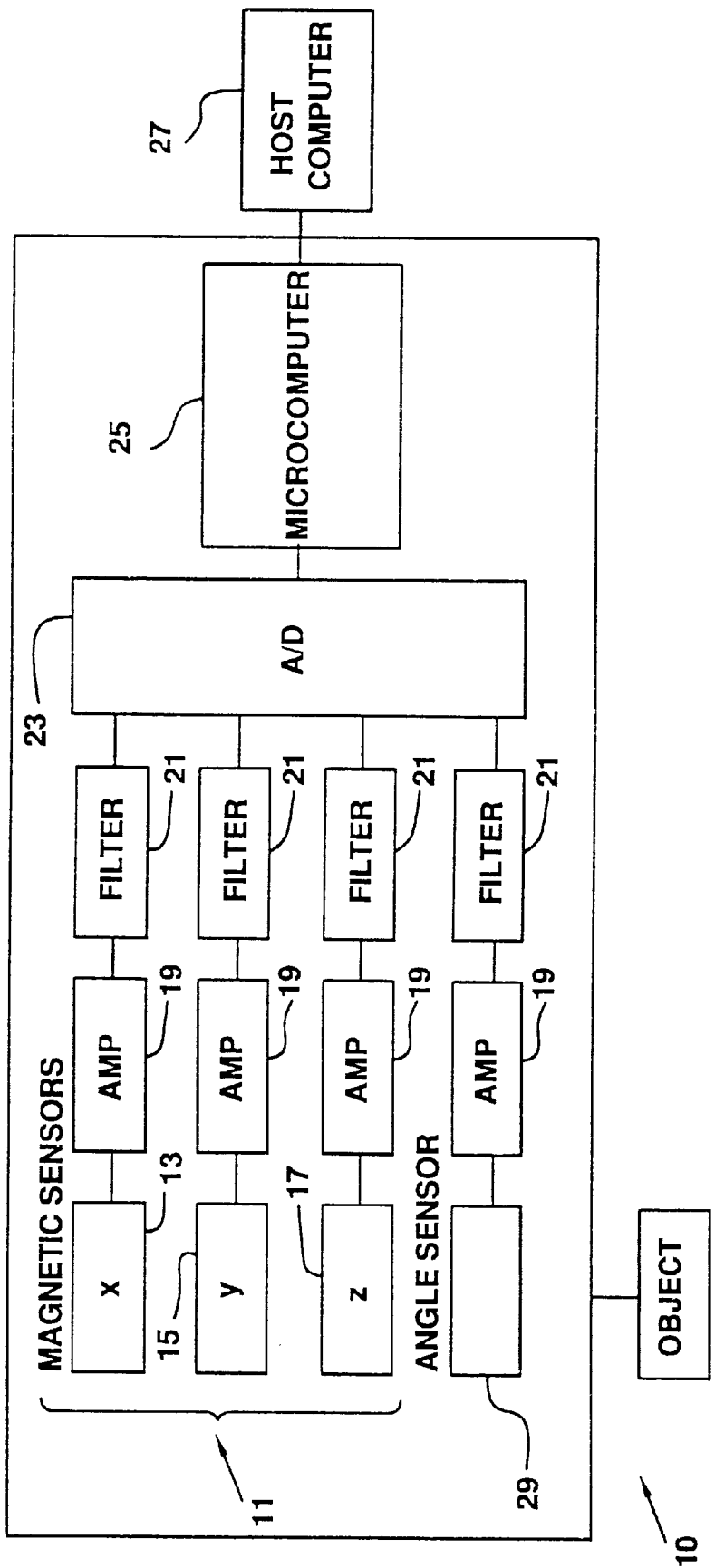
FIG. 1 shows a schematic representation of the electrical circuitry of a first embodiment of the present invention.

With reference, first, to FIG. 1, a first embodiment of the present invention is generally designated by the reference numeral 10 and is seen to include a three-axis magnetic sensor 11 having an x-axis sensor 13, a y-axis sensor 15, and a z-axis sensor 17, each of which is individually connected to an amplifier 19 and fed to an A/D converter 23 via individual filters 21. Signals from the A/D converter 23 are fed to a microcomputer 25 and thence to a host computer 27. Additionally, the first embodiment 10 of the present invention includes an angle sensor 29 that connects with the A/D converter 23 through an amplifier 19 and a filter 21 in the same manner as the axes of the magnetic sensor 11.

Figure 2:
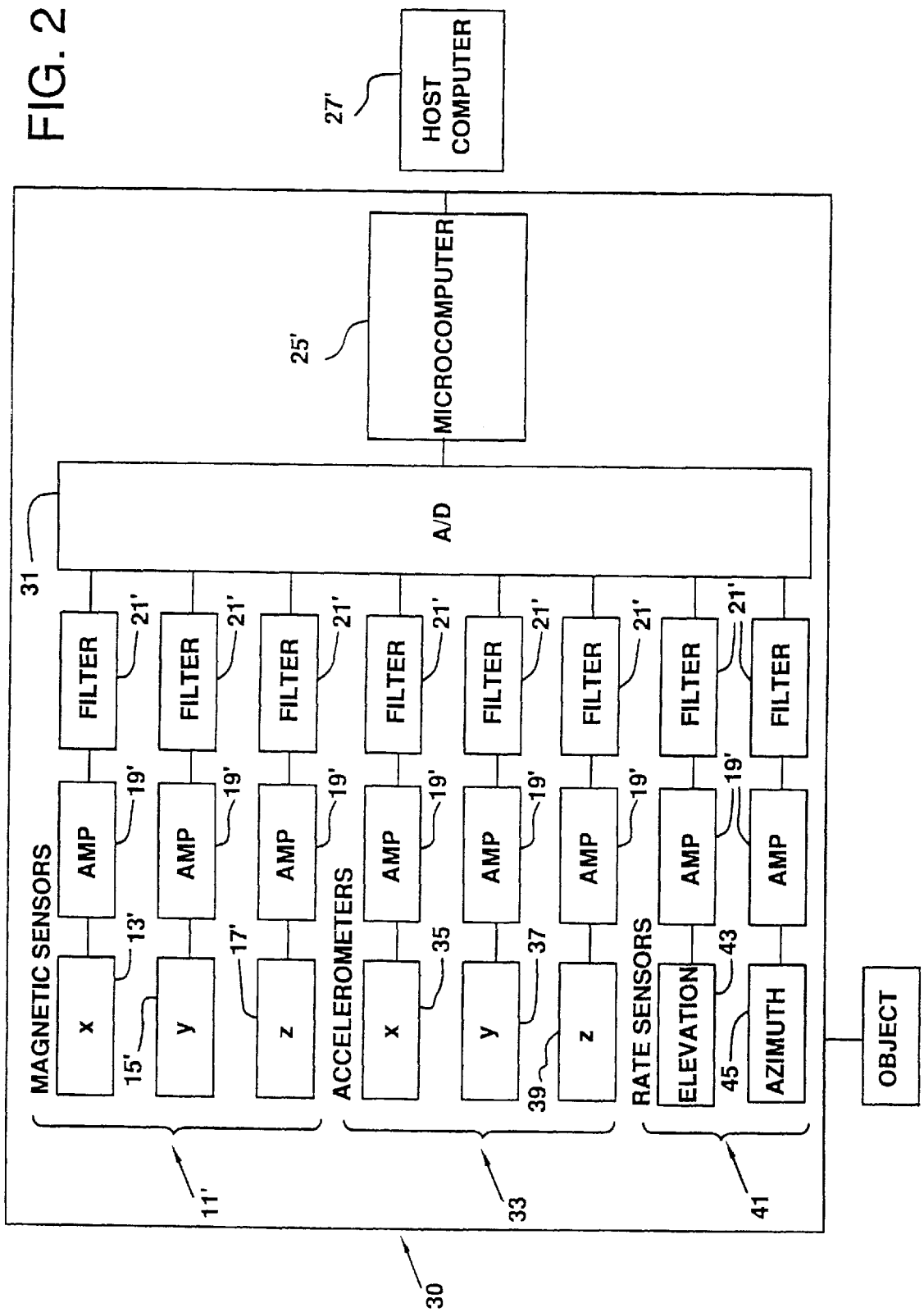
FIG. 2 shows a schematic representation of the electrical circuitry of a second embodiment of the present invention.

With reference to FIG. 2, a second embodiment of the present invention is designated by the reference numeral 30 and like elements are designated using like primed reference numerals. Thus, the system 30 includes a three-axis magnetic sensor 11' having an x-axis sensor 13', a y-axis sensor 15', and a z-axis sensor 17', each of which supplies signals to an A/D converter 31 via an amplifier 19' and a filter 21'. The system 30 also includes a three-axis accelerometer 33 including an x-axis accelerometer 35, a y-axis accelerometer 37, and a z-axis accelerometer 39, each of which supplies signals to the A/D converter 31 via an amplifier 19' and a filter 21'. Additionally, the inventive system 30 includes a two-axis rate sensor 41 including an elevation rate sensor 43 and an azimuth rate sensor 45, each of which supplies signals to the A/D converter 31 via an amplifier 19' and a filter 21'. The A/D converter 31 is interconnected with a microcomputer 25' and a host computer 27'.

Figure 3:
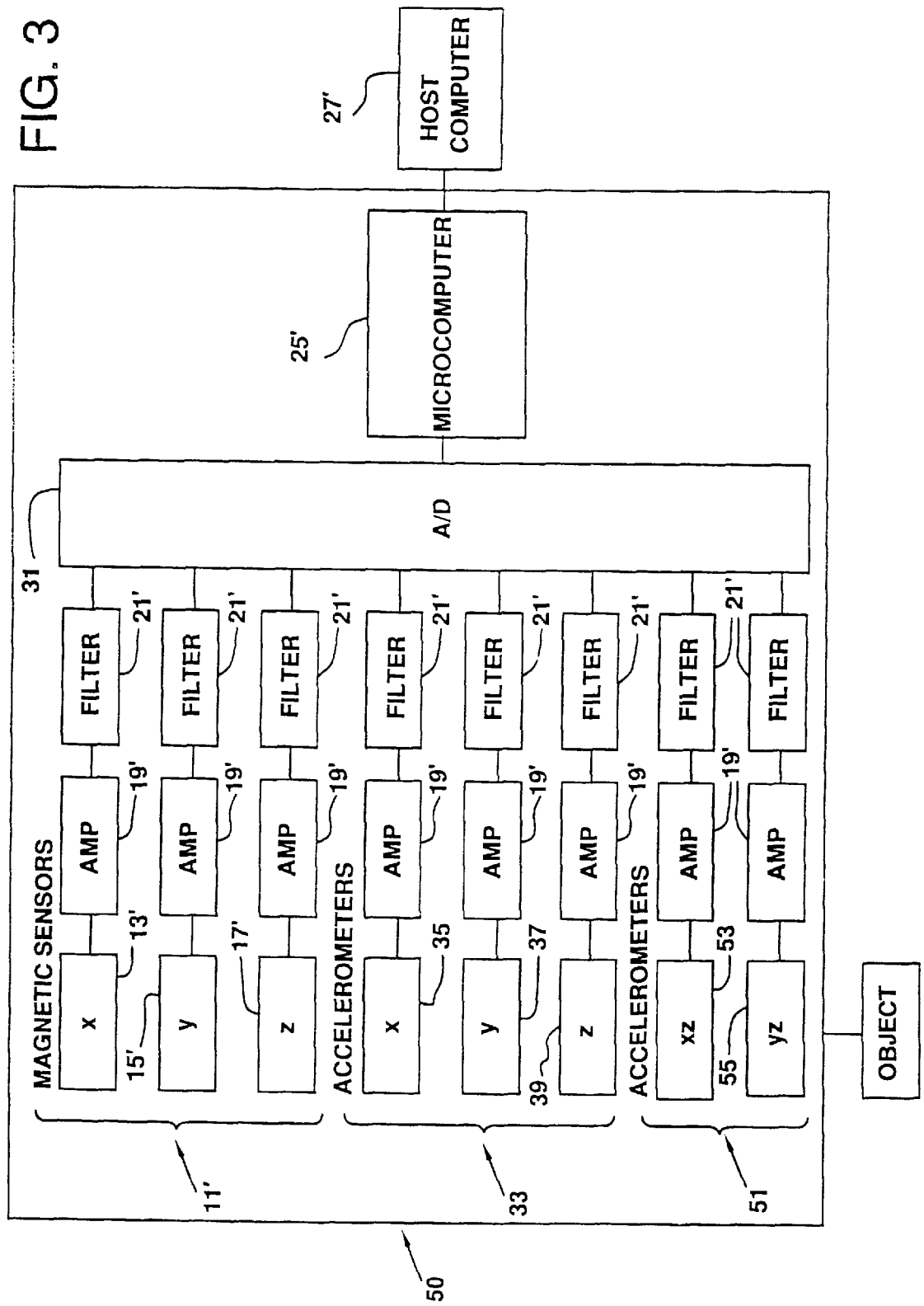
FIG. 3 shows a schematic representation of the electrical circuitry of a variation of the second embodiment of the present invention.

With reference to FIG. 3, a variation to the second embodiment of the present invention is designated by the reference numeral 50. Like elements from the system 30 illustrated in FIG. 2 are designated using like reference numerals. Thus, the system 50 includes a three-axis magnetic sensor 11', a three-axis accelerometer 33', the A/D converter 31', microcomputer 25', and a host computer 27'. In the modification illustrated in FIG. 3, the two-axis rate sensor 41 illustrated in FIG. 2 has been replaced with a pair 51 of spaced differential accelerometers 53 and 55.

Figure 4:
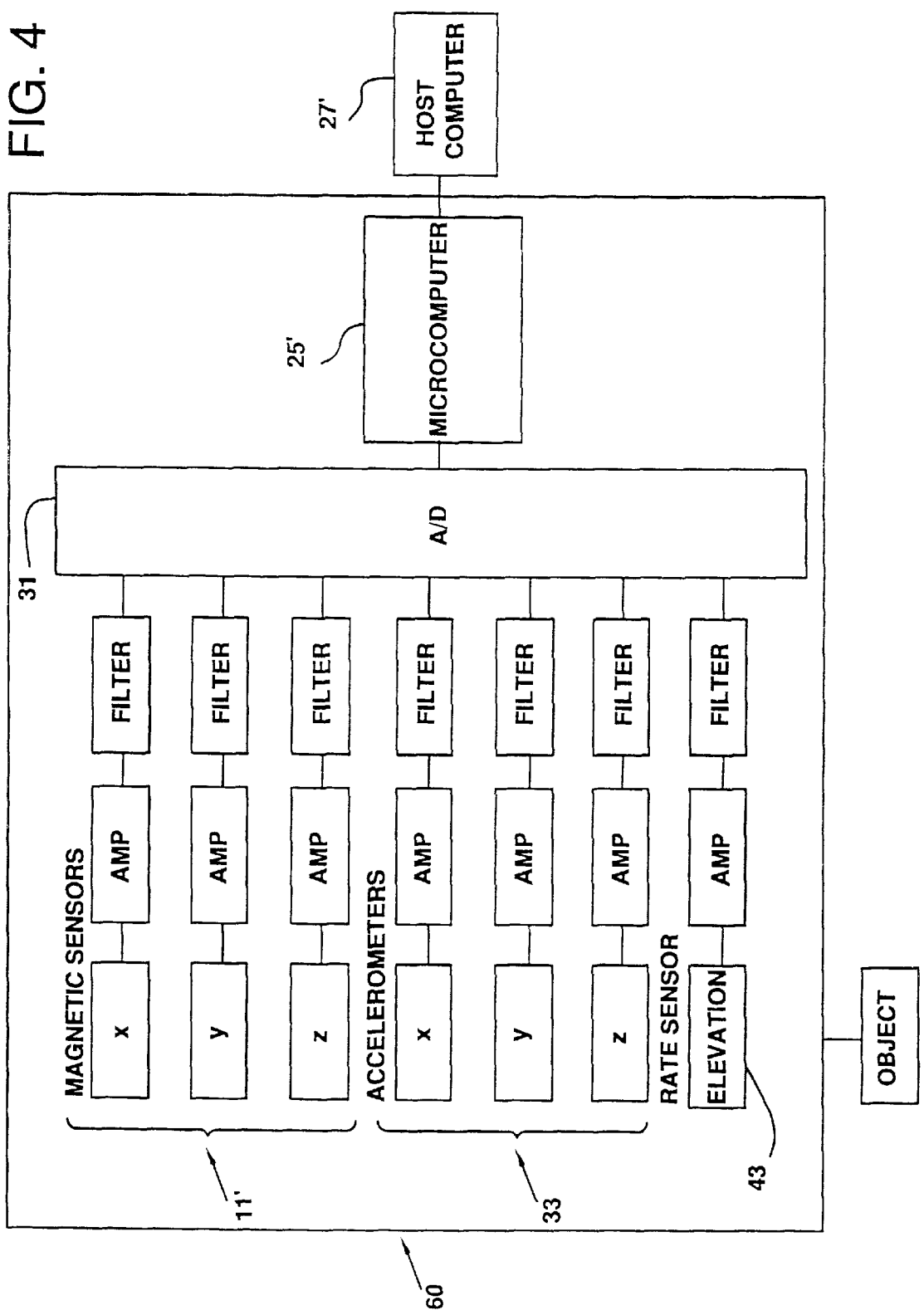
FIG. 4 shows a schematic representation of the electrical circuitry of a third embodiment of the present invention.

FIG. 4 shows a third embodiment of the present invention (FIGS. 2 and 3 being considered to be one embodiment and a modification thereto) that is generally designated by the reference numeral 60. The embodiment of FIG. 4 is the same as that of FIG. 2 (the system 30) except that the azimuth rate sensor 45 and its associated amplifier 19' and filter 21' are omitted.

The magnetic sensor elements schematically depicted in the embodiments described above may comprise fluxgate sensors, magnetoresistive sensors, Hall effect sensors, or any other sensor that can measure the Earth's magnetic field. For example, a fluxgate sensor such as that which is used in the "Bird" from Ascension Technology Corporation may be employed or the HMC1022 Magnetic Sensor manufactured by Honeywell may be employed. The magnetic sensors, whichever type is used, measure the three orthogonal components of the Earth's magnetic field. Signals received from the sensors are amplified in the amplifier 19, 19', are filtered for noise by the filters 21, 21', and are fed to the A/D converter 23, 31, which feeds them to the microcomputer 25, 25'.

The accelerometer elements disclosed hereinabove and designated by the reference numeral 33 as a group and 35, 37, 39, individually, may be any sensors that can measure the acceleration of a mass and thereby the Earth's gravity acceleration. For example, an analog device's ADXL202JQC device may be employed. Signals from the sensors are amplified by the amplifiers 19, 19', are filtered for noise by the filters 21, 21', and are fed to the A/D converter 23, 31 which feeds them to the microcomputer 25, 25'. The rate sensors 43, 45 may comprise any sensor that can measure the angular velocity of a mass, for example, the MicroGyro 100 from Gyration or the GyroStar from Murata Erie. Again, the signals from the sensors are amplified and filtered for noise and fed to the A/D converter and thence to the microcomputer.

In the embodiment of FIG. 3, comprising a modification of the embodiment of FIG. 2, the accelerometer elements 53, 55 can comprise any sensors that can measure the acceleration of a mass and thereby the acceleration of the Earth's gravity.

In the embodiment of FIG. 3, first and second differential accelerometer pairs consist of the x-axis accelerometer element 35 and the x-axis accelerometer element 53. A second differential accelerometer pair consists of the y-axis accelerometer element 37 and the y-axis element 55. For proper operation, the two-axis accelerometer 51 is separated from the three-axis accelerometer 33 by a known distance. The two accelerometers are aligned parallel to one another with signals from the two-axis accelerometer 51 being amplified and filtered for noise and thence fed to the A/D converter and thence to the microcomputer.

Figure 5:
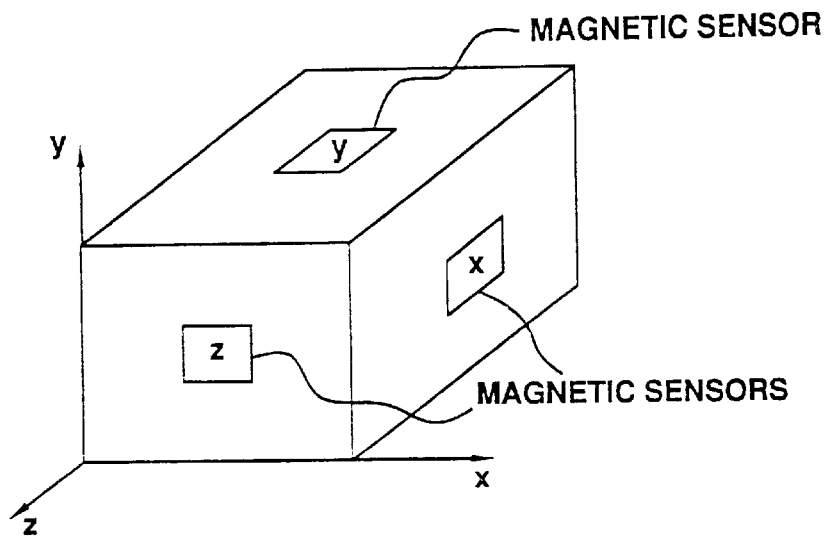
FIG. 5 shows a schematic representation of a three-axis magnetic sensor of the present invention.

FIG. 5 shows the geometry of the placement of the three magnetic sensor elements that make up the three-axis magnetic sensor. The first element is aligned perpendicular to the x-axis in order to measure the Earth's magnetic field parallel to the x-axis. The second element is aligned perpendicular to the y-axis in order to measure the Earth's magnetic field parallel to the y-axis. The third element is aligned perpendicular to the z-axis in order to measure the Earth's magnetic field parallel to the z-axis. The three elements do not have to be concentric to their respective coordinate axis, but each one must simply be perpendicular to each axis in the coordinate system.

Figure 6:
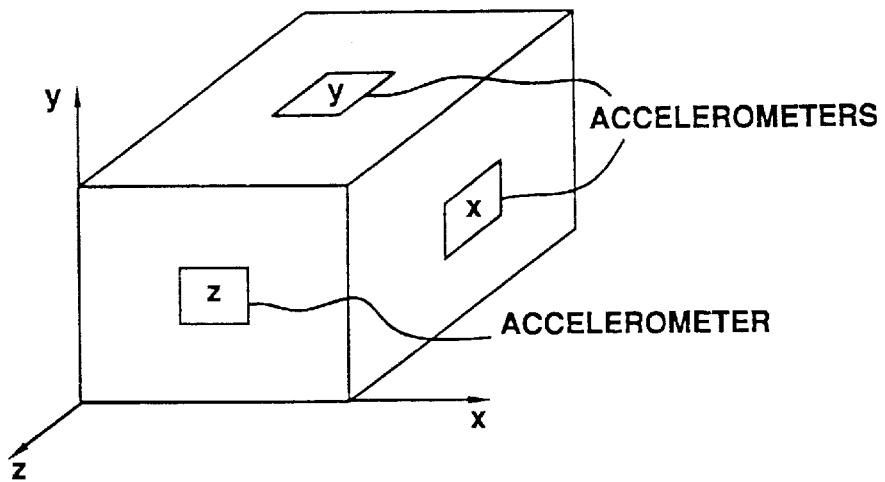
FIG. 6 shows a schematic representation of a three-axis accelerometer of the present invention.

FIG. 6 shows the geometry of the placement of the three accelerometer elements that make up the three-axis accelerometer. The first element is aligned perpendicular to the x-axis in order to measure the Earth's gravity acceleration parallel to the x-axis. The second element is aligned perpendicular to the y-axis in order to measure the Earth's gravity acceleration parallel to the y-axis. The third element is aligned perpendicular to the z-axis in order to measure the Earth's gravity acceleration parallel to the z-axis. The three elements do not have to be concentric to their respective coordinate axis, but each one must simply be perpendicular to each axis in the coordinate system.

Figure 7:
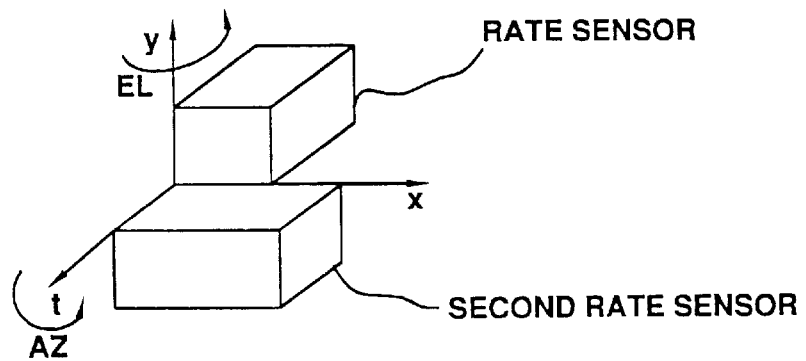
FIG. 7 shows a schematic representation of a rate sensor for measuring azimuth angle velocity and of a second rate sensor for measuring elevation angle velocity.

FIG. 7 shows the two-axis rate sensor. The first sensor is aligned along the z-axis in order to measure the velocity of the azimuth angle change. The second sensor is aligned along the y-axis in order to measure the velocity of the elevation angle change.

Figure 8:
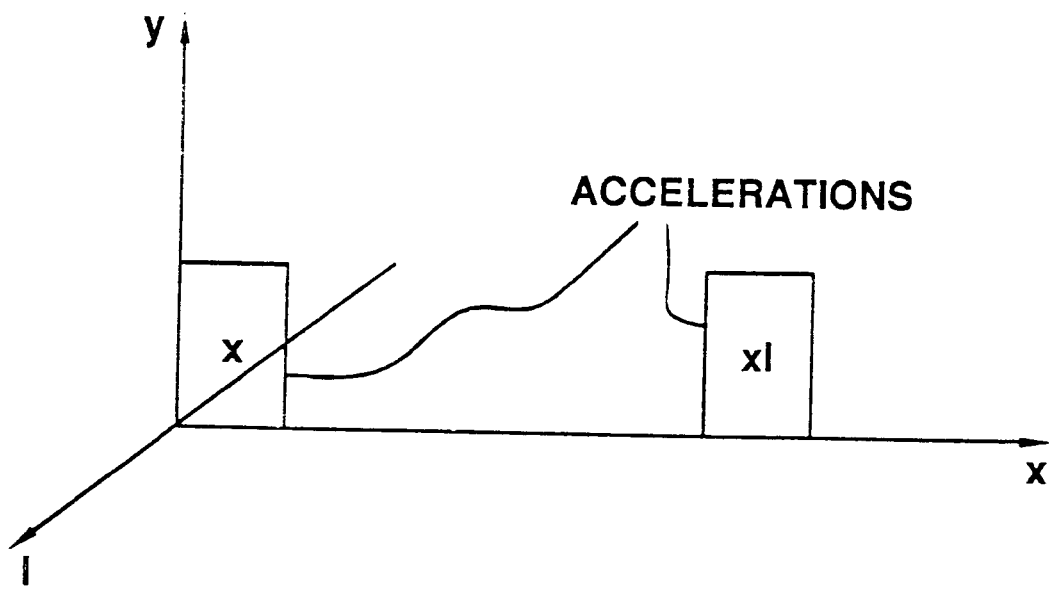
FIG. 8 shows a pair of spaced differential accelerometers for measuring the elevation angle velocity.

FIG. 8 shows the differential accelerometer pair. The first element x is the x element 35 of the three-axis accelerometer. The second element x1 is a single axis accelerometer 53 and it is aligned parallel to the first element. The two elements are separated a known distance from each other.

Figure 9:
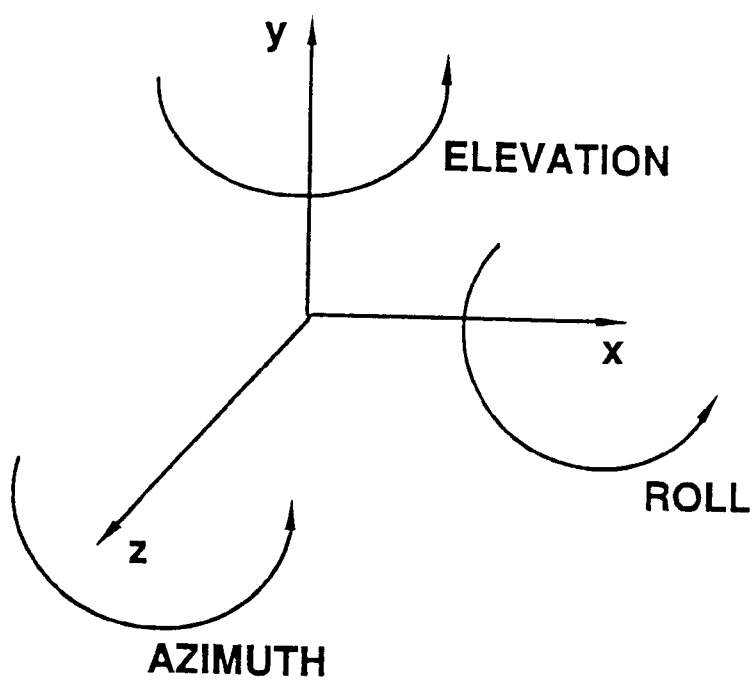
FIG. 9 shows the geometry for the orientation sensor of the present invention.

FIG. 9 shows the geometry of the orientation sensor. The azimuth angle is defined as the rotation around the Z-axis. The elevation angle is defined as the rotation around the Y-axis and the roll angle is defined as the rotation around the X-axis.

Figure 10:
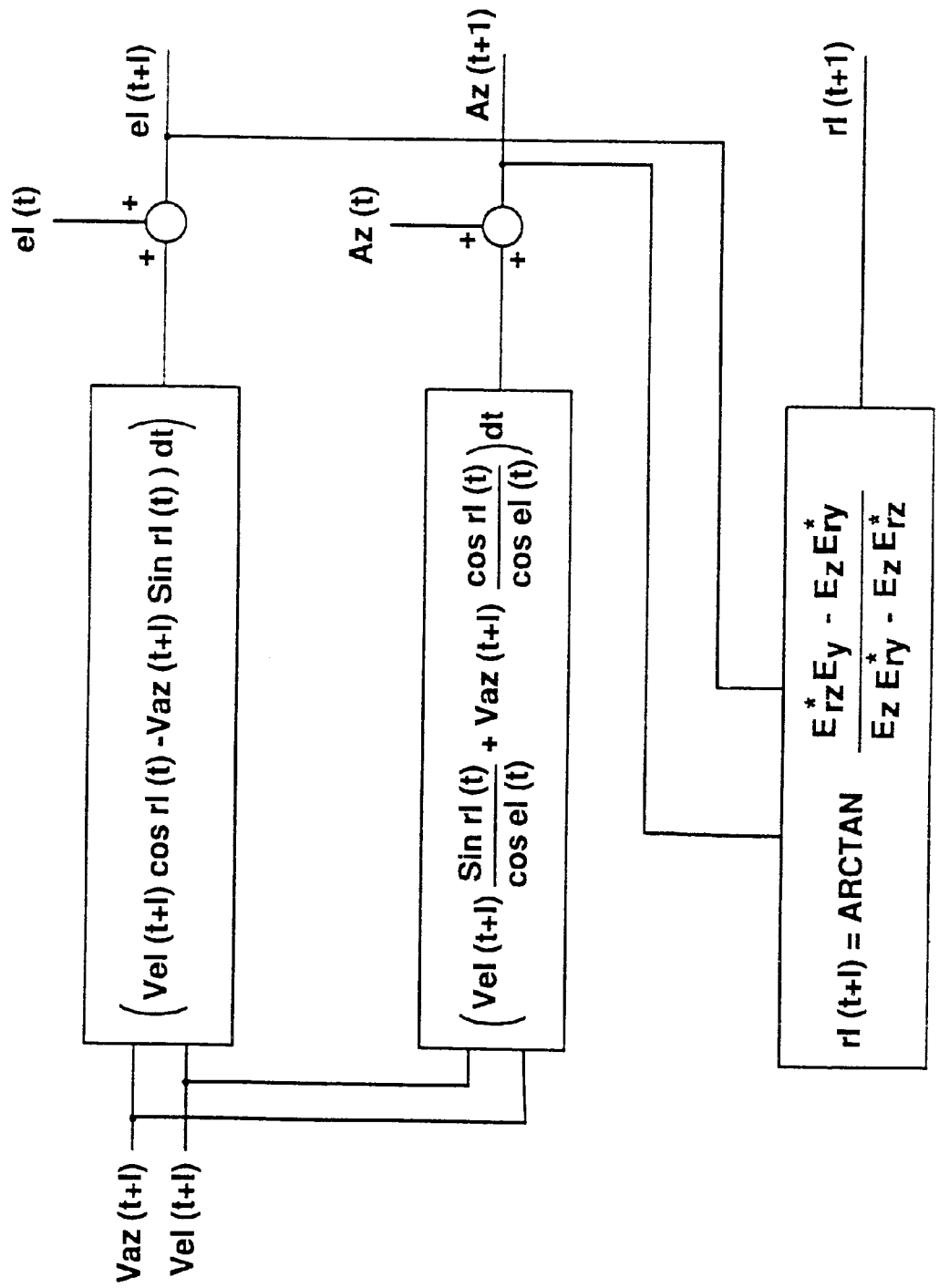
FIG. 10 shows a flowchart for determination of azimuth, elevation and roll angles for the second embodiment of the present invention illustrated in FIG. 2.

FIG. 10 shows a flowchart of the direct calculations necessary to obtain the azimuth, elevation and roll angles for the second embodiment.

Figure 11:
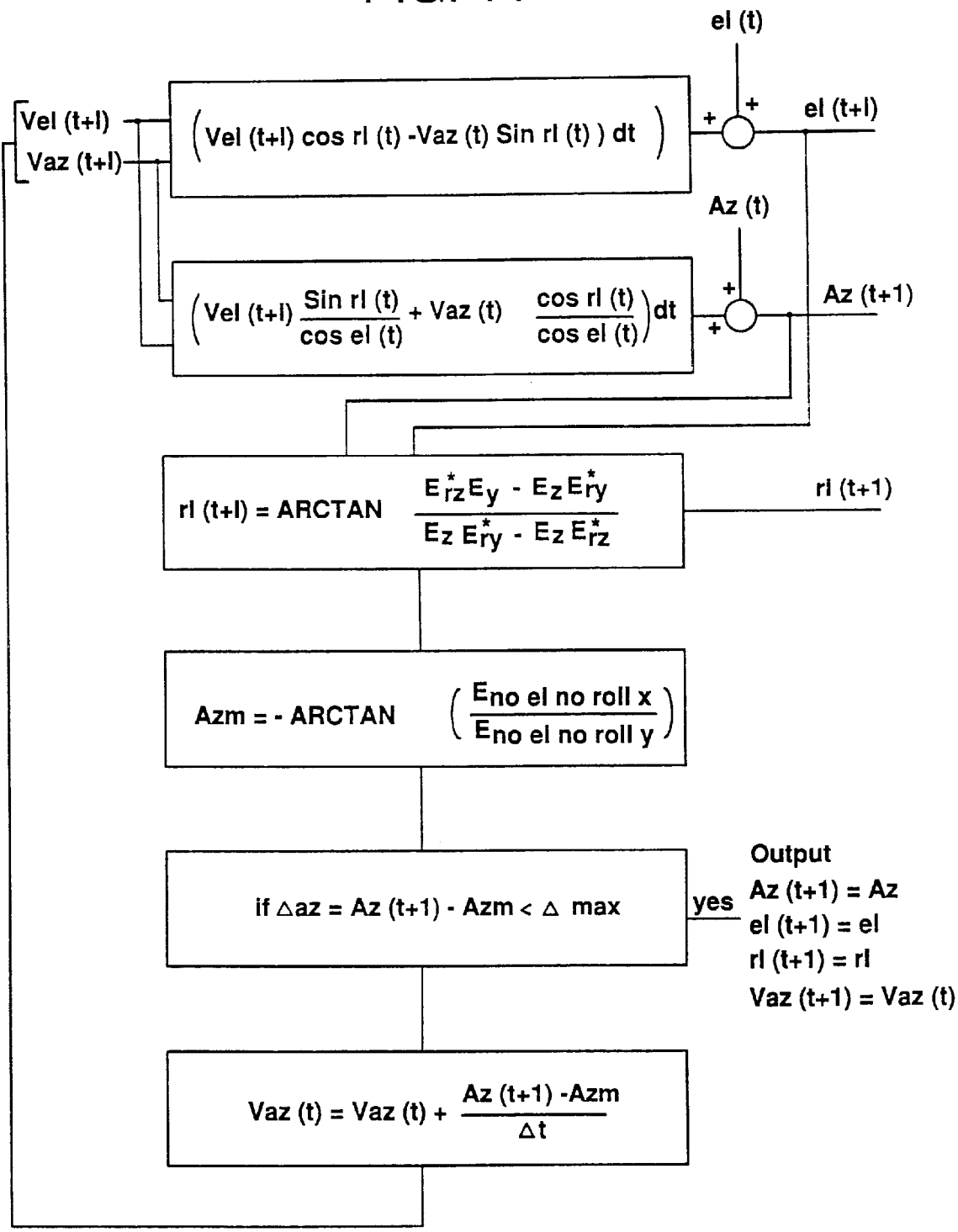
FIG. 11 shows a flowchart for determination of azimuth, elevation and roll angles for the third embodiment of the present invention illustrated in FIG. 4.

FIG. 11 shows the flowchart of the iterative calculations necessary to obtain the azimuth, elevation and roll angles for the third embodiment.

Figure 12:
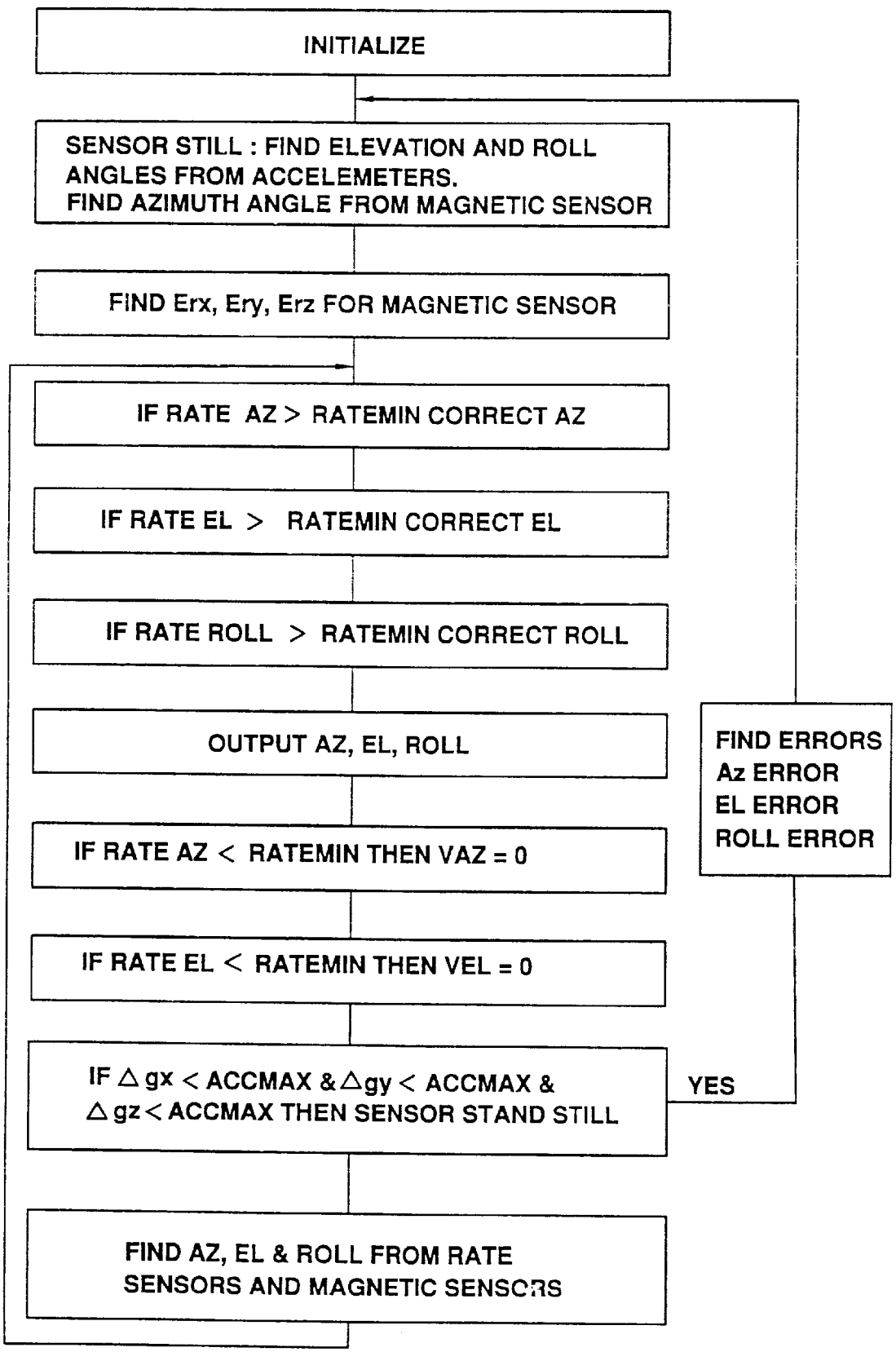
FIG. 12 shows a flowchart for the software employed to control the system of the present invention.

FIG. 12 shows the flowchart for the software that controls the system and performs the necessary calculations and compensations.

First Embodiment

The roll angle can be determined in a fixed reference three-dimensional coordinate frame by any magnetic sensing device available capable of measuring the roll angle. Examples of such magnetic sensing devices are described in U.S. Pat. Nos. 4,849,692; 4,945,305; 3,868,565; 3,983,474; 4,017,858; 4,054,881; 4,298,874; 4,314,251; 4,328,548; 4,346,384; 4,688,037; 4,737,794; and 5,307,072.

The roll angle can also be determined by any optical sensing device available that is capable of measuring the roll angle. An example of such an optical sensing device is described in U.S. Pat. No. 5,574,479.

The roll angle can yet further be determined by any liquid filled tilt sensors or any other sensing devices capable of measuring the roll angle.

It is possible to utilize the measurements of the Earth's magnetic field by the three-axis magnetic sensor to determine the azimuth and elevation angles in a fixed reference three-dimensional coordinate frame after the roll angle has been determined by another means.

The mathematical derivation is as follows:

$$\bar{E} = \bar{\bar{A}} \bar{E}_r \quad (1)$$

Where $E_r$ is the measured vector when all the orientation angles are equal to zero, and $\bar{\bar{A}}$+ee is the rotation matrix, and $\bar{E}$ is the measured vector at the given orientation.

$$\bar{\bar{A}} = \bar{\bar{A}}_{roll} \cdot \bar{\bar{A}}_{elevation} \cdot \bar{\bar{A}}_{azimuth} \quad (2)$$

where $$\bar{\bar{A}}_{az} = \begin{pmatrix} \cos_{az} & \sin_{az} & 0 \\ -\sin_{az} & \cos_{az} & 0 \\ 0 & 0 & 1 \end{pmatrix} \quad (3)$$

$$\bar{\bar{A}}_{el} = \begin{pmatrix} \cos_{el} & 0 & -\sin_{el} \\ 0 & 1 & 0 \\ \sin_{el} & 0 & \cos_{el} \end{pmatrix} \quad (4)$$

$$\bar{\bar{A}}_{roll} = \begin{pmatrix} 1 & 0 & 0 \\ 0 & \cos_{roll} & \sin_{roll} \\ 0 & -\sin_{roll} & \cos_{roll} \end{pmatrix} \quad (5)$$

Since the roll angle is determined by another means, we get:

$$\bar{\bar{A}}^{-1}{}_{roll} \bar{E} = \bar{E}_{no\ roll} = \bar{\bar{A}}_{el} \bar{\bar{A}}_{az} \bar{E}_r \quad (6)$$

which result in the equation $$\begin{bmatrix} E_{no\ roll}\ x \\ E_{no\ roll}\ y \\ E_{no\ roll}\ z \end{bmatrix} = \begin{bmatrix} \cos_{el}\cos_{az} & \cos_{el}\sin_{az} & -\sin_{el} \\ -\sin_{az} & \cos_{az} & 0 \\ \cos_{az}\sin_{el} & \sin_{el}\sin_{az} & \cos_{el} \end{bmatrix} \begin{bmatrix} E_{rx} \\ E_{ry} \\ E_{rz} \end{bmatrix} \quad (7)$$

We then get the second equation from (7)

$$E_{no\ roll}\ y = -\sin_{az} E_{rx} + \cos_{az} E_{ry} \quad (8)$$

We can solve this equation, if the reference is directed towards the Earth's magnetic North, since then $E_{ry}=0$ $$az = -\text{Arcsin}\left(\frac{E_{no\ roll}\ y}{E_{rx}}\right) \quad (9)$$

The other equations from (7) are for $E_{ry}=0$ $$E_{no\ roll}\ x = E_{rx} \cos_{az} \cos_{el} - \sin_{el} E_{rz} \quad (10)$$

$$E_{no\ roll}\ z = E_{rx} \cos_{az} \sin_{el} + \cos_{el} E_{rz} \quad (11)$$

Substitution and rearrangement gives $$el = \text{Arccos} \frac{E_{no\ roll}\ z + \frac{E_{rx}}{E_{rz}}\cos_{az} E_{no\ roll}\ x}{\frac{E_{rx}^2}{E_{rz}^2}\cos_{az} - E_{rz}} \quad (12)$$

The reference values $E_{rx}$ and $E_{rz}$ are measured first, while the sensor is held still. If the sensor is horizontal, meaning el=0, The three equations from (6) become $$E_{no\ roll}\ x = E_{rx} \cos_{az} \quad (13)$$

$$E_{no\ roll}\ y = -\sin_{az} E_{rx} \quad (14)$$

$$E_{no\ roll}\ z = E_{rz} \quad (15)$$

We can then find $$E_{rz} = E_{no\ roll}\ z \quad (16)$$

$$E_{rx} = \sqrt{(E^2_{no\ roll}\ x + E^2_{no\ roll}\ y)} \quad (17)$$

If the initial elevation is not zero, and if we know the initial elevation from another means, such as the three-axis accelerometer, we can then modify (6) to become $$\bar{\bar{A}}^{-1}{}_{el} \bar{\bar{A}}^{-1}{}_{roll} \bar{E} = \bar{E}_{no\ el\ no\ roll} = \bar{\bar{A}}_{az} \bar{E}_r \quad (18)$$

The three equations then become $$E_{no\ el\ no\ roll}\ x = \cos_{az} E_{rx} \quad (19)$$

$$E_{no\ el\ no\ roll}\ y = -\sin_{az} E_{rx} \quad (20)$$

$$E_{no\ el\ no\ roll}\ z = E_{rz} \quad (21)$$

We can then find $$E_{rz} = E_{no\ el\ no\ roll}\ z \quad (22)$$

$$E_{rz} = \sqrt{(E^2_{no\ el no\ roll}\ x + E^2_{no\ el no\ roll}\ z)} \quad (23)$$

The ambiguities at ±90 degrees in the determination of the azimuth angle from Equation 6 can be solved by using the y-axis element of the three-axis accelerometer in order to utilize the sign of the acceleration sensor to determine if the azimuth angle is getting bigger or smaller.

It is also possible to determine the azimuth and roll angles from the measurements of the Earth's magnetic field after the elevation angle has been determined by other means.

It is possible to utilize only two magnetometer elements, since the Earth's magnetic field is constant if used in the same geographical area. It is therefore possible to calculate what the third element (the missing one) would measure from the following equation:

$$E_x = \sqrt{(E^2 - E^2_y - E^2_z)} \quad (24)$$

Since the Earth's magnetic field strength changes dependent upon where one may be on the Earth, it may be necessary to perform an initial calibration in order to find the total field strength of the Earth's magnetic field. The user must rotate the sensor, once, 90 degrees, in order to measure the third magnetic field element of the Earth's magnetic field. This process only needs to be repeated if the sensor is moved to another geographical area such as from Iowa to Alaska, for example.

Second Embodiment
Determination of the Absolute Roll and Elevation Angles in a Fixed Reference Three-Dimensional Coordinate Frame—for Holding Still and Very Slow Motion The three-axis accelerometer is used to measure the acceleration of the Earth's gravity. It is possible to determine the roll angle and the elevation angle from these measurements:

$$g_x = g\ \sin_{el} \quad (25)$$

$$g_y = -g\ \sin_{rl} \cos_{el} \quad (26)$$

$$g_z = -g\ \cos_{rl} \cos_{el} \quad (27)$$

Where el is elevation and rl is roll. This means that we can solve for elevation and roll with:

$$el = \arcsin gx / \sqrt{(gx + gy + gz)} \quad (28)$$

$$roll = \arctan(gy/gz) \quad (29)$$

It is possible to utilize only two accelerometer elements, since the acceleration of the Earth's gravity is constant. It is therefore possible to calculate what the third element (the missing one) would measure from the following equation:

$$gx = \sqrt{(g^2 - g^2_y - g^2_z)} \quad (30)$$

This determination works well to find the absolute value of the elevation and roll angles. It does not work as effectively if there are lateral movements of the orientation sensor, since any linear accelerations will cause errors in the angle determination.

A dynamic lowpass filter is used on the output of the three-axis accelerometer in order to filter out the linear translations. This filter works well if the movements are slow with minimal linear movement. If there are linear accelerations, the filter will apply more filtration which will provide error free results but will cause more and more lag as a function of linear movements.

It is also possible to utilize tilt sensors in order to find the absolute roll and elevation angles. Tilt sensors are usually made from liquid filled sensors where the changes in capacitance or resistance is measured relative to the tilt angle. These sensors suffer from the "slosh" effect, meaning that it takes time for the liquid to settle down during quick motions.

Determination of the Absolute Azimuth Angle in a Fixed Reference Three-Dimensional Coordinate Frame—for Holding Still and Very Slow Motion When the elevation and roll angles have been determined, the azimuth angle can easily be determined from the measurements from the magnetic sensors by using the formula:

$$az = -\text{Arctan}\left(\frac{E_{no\ el no\ roll} x}{E_{no\ el no\ roll} y}\right) \quad (31)$$

Determination of the Azimuth, Elevation and Roll Angles in a Fixed Reference System—During Motion
Using a Two-Axis Rate Sensor The first rate sensor measures the angular velocity for azimuth, Vaz, and the second rate sensor measures the angular velocity for elevation, Vel, in the sensor reference frame. If the prior orientation angles are known at the time t, it is possible to find the angular velocity for azimuth, Vaaz, and the angular velocity for elevation, Vael, in the fixed reference coordinate system at the time t+1.

$$Vaaz(t+1) = Vel(t+1)*\text{Sin}\ (roll(t))/\text{Cos}\ (el(t)) + Vaz(t+1)*\text{Cos}\ (roll(t))/\text{Cos}\ (el(t)) \quad (32)$$

$$Vael(t+1) = Vel(t+1)*\text{Cos}\ (roll(t)) - Vaz(t+1)*\text{Sin}\ (roll(t)) \quad (33)$$

Simple integration of Vaaz(t+1) will result in the absolute azimuth angle and simple integration of Vael(t+1) will result in the absolute elevation angle in the fixed reference system.

It is then possible to use the measurements from the magnetic sensors to find the roll angle by using the following formulas:

$$\bar{E} = \bar{A}roll*\bar{A}el*\bar{A}az*\bar{E}r \quad (34)$$

Using the elevation and azimuth angles from above results in $$\bar{E} = \bar{A}roll * \bar{E}noelnoazr \text{ or} \quad (35)$$

$$Ex = E^*xr \quad (36)$$

$$Ey = E^*yr*\text{Cos roll} - E^*zr*\text{Sin roll} \quad (37)$$

$$Ez = E^*yr*\text{Sin roll} + E^*zr*\text{Cos roll} \quad (38)$$

These last two equations can be solved for $$roll = \text{Arctan}((E^*zr*Ey - Ez*E^*yr)/(Ez*E^*yr - Ez*E^*zr)) \quad (39)$$

FIG. 10 shows the flowchart of the direct calculations needed in order to get the azimuth, elevation and roll angles in a fixed reference three-dimensional coordinate frame.

Third Embodiment
Determination of the Azimuth, Elevation and Roll Angles in a Fixed Reference System—During Motion
Using a One-Axis Rate Sensor The single axis rate sensor measures the angular velocity for elevation, Vel, in the sensor reference frame. The formulas 32 and 33 from above are used as follows:

$$Vaaz(t+1)=Vel(t+1)*\sin(roll(t))/\cos(el(t))+Vaz(t+1)*\cos(roll(t))/\cos(el(t)) \quad (40)$$

$$Vael(t+1)=Vel(t+1)*\cos(roll(t))-Vaz(t)*\sin(roll(t)) \quad (41)$$

Since only the elevation velocity, Vel, is known, an iterative method must be used. The best guess for the azimuth velocity is the prior azimuth velocity, Vaz(t).

Simple integration of Vaaz(t+1) will result in the best estimate for the absolute azimuth angle, az, and simple integration of Vael(t+1) will result in the best estimate for the absolute elevation angle, el, in the fixed reference system.

It is then possible to use the measurements from the magnetic sensors to find the best estimate for the roll angle by using the same formulas 34 to 39 as above.

$$roll = \text{Arctan}((E^*zr*Ey - Ez*E^*yr)/(Ez*E^*yr - Ez*E^*zr)) \quad (42)$$

Since we now have an estimate for both roll and elevation, we can use the formula 34 from above to end up with:

$$\bar{A}^{-1}_{roll}*\bar{A}^{-1}el*\bar{E}=\bar{A}az\bar{E}r \quad (43)$$

We can find the azimuth angle from these equations as done in Equation 31 to be:

$$azm = -\text{Arctan}\left(\frac{E_{no\,roll\,no\,el}x}{E_{no\,roll\,no\,el}y}\right) \quad (44)$$

We can then find the difference in the determination of the azimuth angle azm−az and determine the next value for the Vaz(t)=V(t)+(azm−az)/Δt and perform a new iteration. This iterative procedure will continue until the difference azm−az is less than a predetermined value.

FIG. 11 shows the flowchart of the iterative calculations needed in order to get the azimuth, elevation and roll angles in a fixed reference three-dimensional coordinate frame.
Control and Compensation for Drift An initial initialization must be performed in order to find the reference parameters for the magnetic sensor. This is done when the user holds still at the beginning. The elevation and roll angles are found from the three-axis accelerometer measurements as shown in Equations 28 and 29 and the azimuth angle is then found from the three-axis magnetic sensor measurements as shown in Equation 31. This means that the orientation sensor can be placed at any orientation for this initialization.

Since the rate sensors used for measurements of the angular velocity experience drift over time, it is necessary to switch to the absolute sensors when the sensor is held still or moved very slowly and to utilize the measurements of these "drift free" sensors to compensate for this drift.

FIG. 12 shows a flowchart for the software that controls, calculates the orientation angles and compensates for drift. If the output of a rate sensor is less than a predetermined value, the rate is set to zero. If all the outputs of the elements of the accelerometer are less than a predetermined value, the tracker is deemed to being held still or moving at a very slow speed. A re-initialization is therefore performed and the accelerometer's and magnetic sensor's outputs are being used for slow motion calculations of the orientation angles. The absolute "drift" error is calculated. When the sensor is moved again, the stored absolute "drift" error is applied as a function of the angular rates until all have been accounted for.
Variations of Second and Third Embodiments
Replacing Each Rate Sensor with a Differential Accelerometer Pair
Using a Differential Accelerometer Pair The differential accelerometer pair, accelerometers x and x2, is used in order to replace one rate sensor. The outputs of the two accelerometers are:

$$gx=g\sin el-groll+g\,trans \quad (45)$$

$$gx2=g\sin el+groll+g\,trans \quad (46)$$

This means that the rotation acceleration can be found by the sum of the two signals. It is not affected by any translation movement.

$$groll=1/2(gx1+gx2) \quad (47)$$

The velocity of the roll angle can then be determined by a simple integration, the sum of the two signals $$V_{roll}(t) = \int_0^T g_{roll}dt \quad (48)$$

Accordingly, an invention has been disclosed in terms of preferred embodiments thereof which fulfill each and every one of the objects of the present invention as set forth hereinabove and provide a new and useful sourceless orientation sensor of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

We claim:

1. A sourceless orientation sensor, comprising:
   a) two-axis magnetic sensing means for measuring the Earth's magnetic field,
   b) measuring means for measuring elevation or roll angle of said object with respect to a fixed reference three-dimensional coordinate frame, and
   c) computing means for controlling the taking of measurements by said magnetic sensing means and measuring means and converting said measurements into azimuth, elevation and roll angles relative to a fixed coordinate frame, wherein said computing means receives signals from an initial calibration procedure of said magnetic sensing means and determines constant Earth magnetic field intensity and therefrom calculates a third axis component of the Earth's magnetic field.

2. The sensor of claim 1, wherein said measuring means comprises an angle sensor.

3. The sensor of claim 2, wherein said measuring means is chosen from the group consisting of a magnetic sensing device, tilt sensors or an optical sensing device.

4. The sensor of claim 1, wherein said magnetic sensing means comprises a three-axis magnetic sensing means, said axes being mutually orthogonal.

5. The sensor of claim 4, further including an amplifier, lowpass filter and A/D converter interposed between said sensing means and said computer.

6. The sensor of claim 4, further including an amplifier, lowpass filter and A/D converter interposed between said measuring means and said computer.

7. A method of measuring the orientation of an object, including the steps of:
   a) providing a sourceless orientation sensor comprising:
      i) two-axis magnetic sensing means for measuring the Earth's magnetic field,
      ii) measuring means for measuring elevation or roll angle of said object with respect to a fixed reference three-dimensional coordinate frame; and
      iii) a computer interconnected with said sensing means and measuring means;
   b) programming said computer with first data from an initial calibration procedure of measurements of the constant intensity of the Earth's magnetic field;
   c) feeding said computer second data from said sensing means concerning two axes of the Earth's magnetic field;
   d) calculating, in said computer, a third axis of the Earth's magnetic field;
   e) feeding said computer third data from said measuring means concerning elevation or roll angle of said object in a fixed reference three-dimensional coordinate frame;
   f) calculating orientation of said object in terms of azimuth, elevation and roll relative to a fixed reference three-dimensional coordinate frame.

8. The method of claim 7, further including the steps of amplifying and filtering said data.

9. The method of claim 7, further including the step of providing said magnetic sensing means with a third axis sensor.

10. A sourceless orientation sensor for determining orientation of an object, comprising:
    a) two-axis magnetic sensing means for measuring direction and strength of the Earth's magnetic field;
    b) accelerometer means for measuring acceleration of the Earth's gravity force;
    c) measuring means for measuring elevation and azimuth angle velocities of said object with respect to a sensor frame; and
    d) computer means for controlling taking of said measurements and for converting said measurements into azimuth, elevation and roll angles of said object with respect to a fixed reference three-dimensional coordinate frame.

11. The sensor of claim 10, wherein said measuring means comprises a plurality of rate sensors.

12. The sensor of claim 11, wherein said rate sensors comprise an elevation rate sensor and an azimuth rate sensor.

13. The sensor of claim 11, said rate sensors including means for measuring angular velocity of a mass.

14. The sensor of claim 11, wherein said measuring means comprises a plurality of pairs of spaced accelerometers.

15. The sensor of claim 14, wherein said accelerometers comprise an elevation sensor and an azimuth sensor.

16. The sensor of claim 15, wherein said computer means includes means for performing an integration in order to find the elevation rate and the azimuth rate.

17. The sensor of claim 10, wherein said measuring means comprises one rate sensor.

18. The sensor of claim 10, wherein said computer means includes means for receiving signals from an initial calibration of said magnetic sensing means and determining the constant Earth magnetic field intensity and therefrom calculating a third axis component of the Earth's magnetic field.

19. The sensor of claim 10, wherein said magnetic sensing means has a third axis of magnetic sensing means, said axes being mutually orthogonal.

20. The sensor of claim 10, wherein said accelerometer means comprises a three-axis accelerometer for measuring acceleration of the Earth's gravity, said computer receiving further signals from said three-axis accelerometer and, therefrom, determining roll angle and elevation angle of said object with respect to a fixed reference three-dimensional coordinate frame, when the sensor is held still or moving very slowly.

21. The sensor of claim 20, wherein said computer means includes means for controlling receiving of signals from said magnetic sensing means and therefrom calculates azimuth angle of said object with respect to a fixed reference three-dimensional coordinate frame, when said sensor is held still or is moving very slowly.

22. The sensor of claim 21, wherein said computer means includes means for finding drift errors on orientation angles by finding a difference between orientation angles determined from "drift free" measurements, when the sensor is held still and the orientation angles determined from using measurements from said measuring means.

23. The sensor of claim 22, wherein said computer means further compensates for said drift errors, when said sensor is moving, dependent upon rate of angular movements of said sensor.

24. The sensor of claim 10, further including an amplifier and lowpass filter interposed between said sensing means and said computer.

25. The sensor of claim 11, further including an amplifier and lowpass filter interposed between said measuring means and said computer.

26. A method of measuring the orientation of an object, including the steps of:
    a) providing a sourceless orientation sensor comprising:
       i) two-axis magnetic sensing means for measuring the Earth's magnetic field;
       ii) accelerometer means for measuring acceleration of the Earth's gravity force;
       iii) measuring means for measuring elevation and azimuth angle velocities of said object in a sensor frame; and
       iv) a computer interconnected with said sensing means and measuring means;
    b) programming said computer with first data from an initial calibration procedure of measurements of the constant intensity of the Earth's magnetic field;
    c) feeding said computer second data from said sensing means concerning two axes of the Earth's magnetic field;
    d) calculating, in said computer, a third axis of the Earth's magnetic field;
    e) feeding said computer third data from said accelerometer means concerning acceleration of the Earth's gravity force;
    f) said computer converting said angular velocity measurements into elevation and azimuth angles of said object in a fixed reference three-dimensional coordinate frame;
    g) said computer further converting said second data from said sensing means into roll angle of said object with respect to a fixed reference three-dimensional coordinate frame;

h) said computer outputting azimuth, elevation and roll angles with respect to a fixed reference three-dimensional coordinate frame.

27. The method of claim 26, further including the steps of amplifying and filtering said data.

28. The method of claim 26, further including the step of providing said magnetic sensing means with a third axis sensor.

29. The method of claim 26, wherein said step of feeding said computer third data is carried out by measuring acceleration of the Earth's gravity with a three-axis accelerometer.

30. The method of claim 26, wherein said measuring means comprises two pairs of spaced accelerometers.

31. The method of claim 30, further including the step of integrating a sum of outputs from said two pairs of spaced accelerometers to determine velocity of azimuth and elevation of said object.

32. The method of claim 27, including the further step of calculating azimuth angle of said object, with respect to a fixed reference three-dimensional coordinate frame, from signals from said magnetic sensing means, when the sensing means is held still or moving very slowly.

33. The method of claim 32, including the step of finding drift errors on orientation angles by finding a difference between orientation angles determined from the "drift free" measurements, when said sensor is held still and orientation angles determined from using measurements from said measuring means.

34. The method of claim 33, including the further step of compensating for said drift errors, when the magnetic sensing means is moving, depending upon a rate of the angular movement.

35. A method of measuring the orientation of an object, comprising:
　a) providing a sourceless orientation sensor comprising:
　　i) two-axis magnetic sensing means for measuring Earth's magnetic field;
　　ii) accelerometer means for measuring acceleration of Earth's gravity force;
　　iii) measuring means for measuring elevation velocity of said object in a sensor frame;
　　iv) a computer interconnected with said sensing means and said measuring means;
　b) programming said computer with first data from an initial calibration procedure of measurements of constant intensity of the Earth's magnetic field;
　c) feeding said computer with second data from said magnetic sensing means concerning two axes of Earth's magnetic field;
　d) calculating, in said computer, a third axis of the Earth's magnetic field;
　e) feeding said computer third data from said accelerometer means concerning acceleration of Earth's gravity force;
　f) said computer converting said elevation velocity and a last determined azimuth velocity into elevation and azimuth angle estimates of said object relative to a fixed reference three-dimensional coordinate frame;
　g) said computer further converting said signals from said magnetic sensing means into roll angle estimates of said object relative to said fixed reference three-dimensional coordinate frame;
　h) said computer further using said signals from said magnetic sensing means to find a different azimuth angle, comparing this azimuth angle to an azimuth angle estimate and finding a more accurate azimuth angle velocity estimate;
　i) said computer repeating steps f–h until a difference between two consecutively determined azimuth angles is less than a preprogrammed level;
　j) said computer outputting to a host computer said azimuth, elevation and roll angles of said object relative to said fixed reference three-dimensional coordinate frame.

36. The method of claim 35, further including the step of providing said magnetic means with a third axis sensor.

* * * * *